United States Patent [19]

Gosswiller

[11] 4,357,595
[45] * Nov. 2, 1982

[54] FLASHING LIGHT WARNING SYSTEM FOR VEHICLES

[75] Inventor: Earl W. Gosswiller, Clarendon Hills, Ill.

[73] Assignee: Federal Signal Corporation, Oak Brook, Ill.

[*] Notice: The portion of the term of this patent subsequent to Dec. 16, 1997, has been disclaimed.

[21] Appl. No.: 203,989

[22] Filed: Nov. 4, 1980

Related U.S. Application Data

[63] Continuation-in-part of Ser. No. 868,075, Jan. 9, 1978, Pat. No. 4,240,062.

[51] Int. Cl.³ .................. B60Q 1/46; B61L 29/24; G02B 5/12; F21V 21/30
[52] U.S. Cl. ........................... 340/81 R; 340/50; 340/84; 340/87; 350/99; 350/289; 362/35; 362/170
[58] Field of Search ............ 340/81 R, 84, 50, 87, 340/83, 133; 362/35, 170, 255; 350/97–100, 101, 288, 289

[56] References Cited

U.S. PATENT DOCUMENTS 3,404,371  10/1968  Gosswiller ..................... 340/50
3,789,358  1/1974  Ellis ........................... 340/50
4,240,062  12/1980  Gosswiller ..................... 340/84

Primary Examiner—John W. Caldwell, Sr.
Assistant Examiner—Donnie Lee Crosland
Attorney, Agent, or Firm—Charles F. Pigott, Jr.

[57] ABSTRACT

A flashing light system for mounting on the roof of a police car or other vehicle where special warning lights are desired. The system includes a plurality of lights preferably arranged side-by-side across the width of the vehicle roof, each of the lights having associated therewith a parabolic reflector or beam-shaping lens which rotates about a vertical axis approximately coaxial with the axis of the corresponding light source thereby creating a flashing effect. The several parabolic reflectors or beam-shaping lenses are driven conjointly from a common drive motor, and the plurality of rotatable reflectors or lenses may be arranged at predetermined angles relative to one another so as to vary the sequence of the light flashes and thus create an unlimited variety of different flashing effects. In accordance with a preferred embodiment, each light source is stationary while its associated reflector or lens rotates, the reflectors or lenses being oriented at different rotational positions relative to one another to achieve the foregoing desired variety of different flashing effects.

8 Claims, 10 Drawing Figures

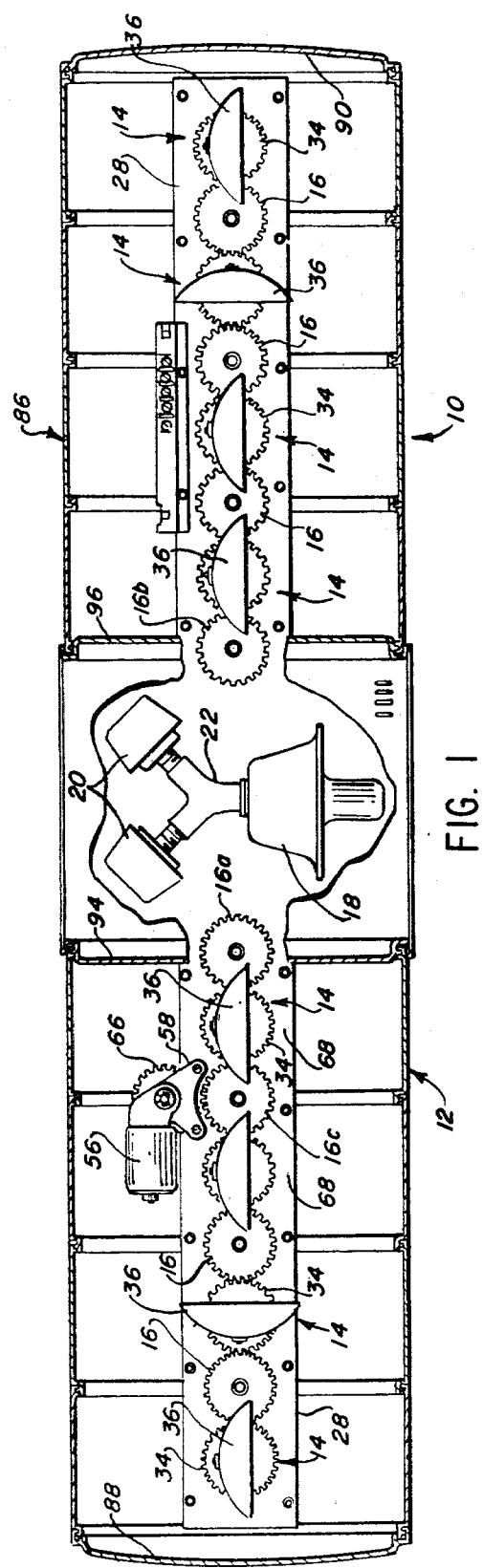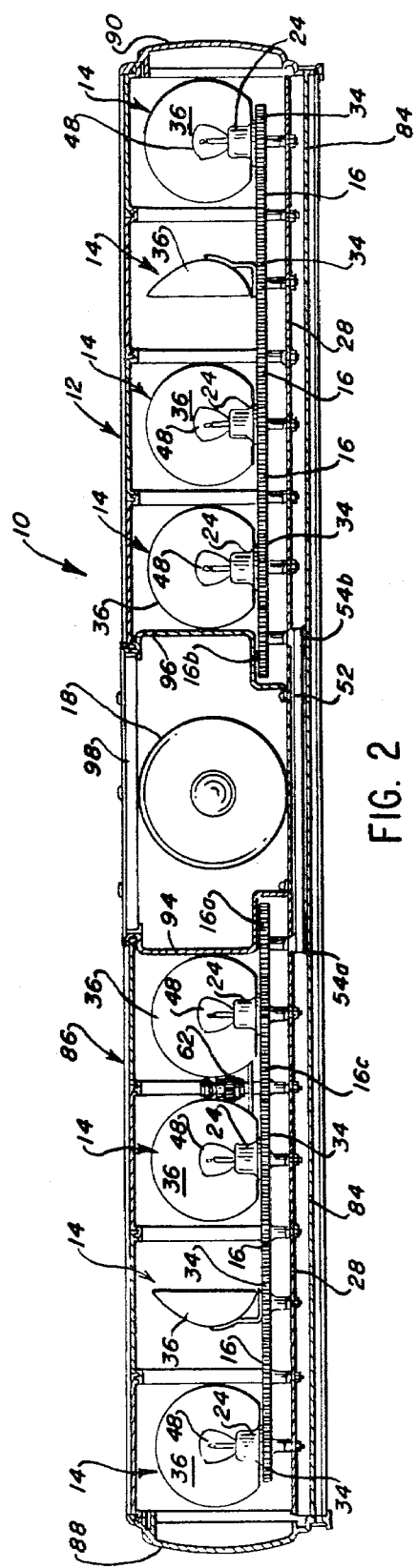

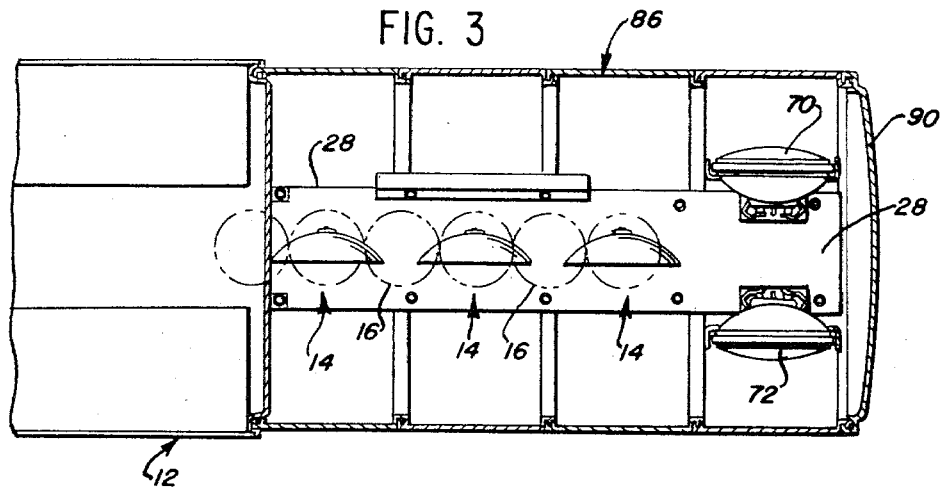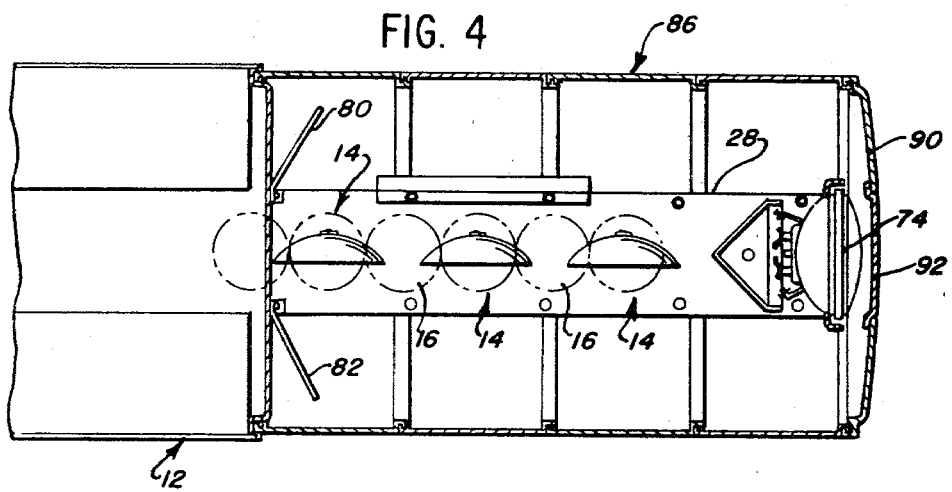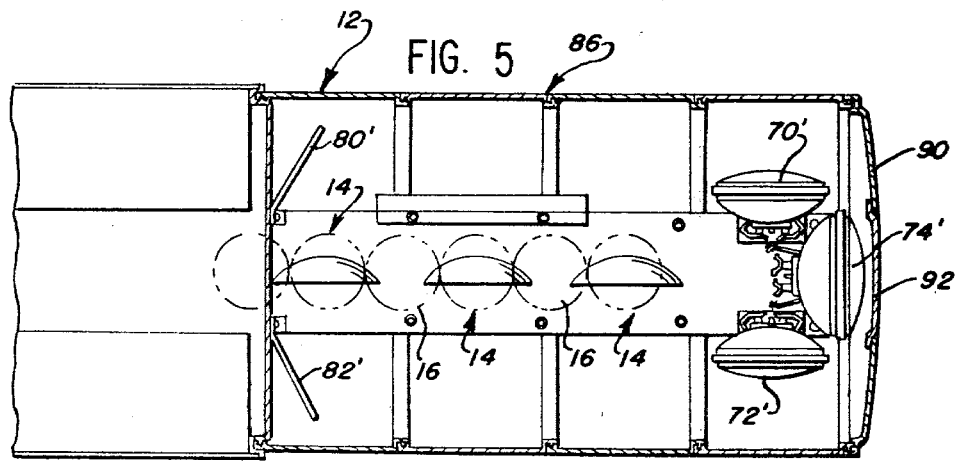

FLASHING LIGHT WARNING SYSTEM FOR VEHICLES

CROSS-REFERENCE TO RELATED APPLICATION

This application is a continuation-in-part of copending application Ser. No. 868,075, filed Jan. 9, 1978, now U.S. Pat. No. 4,240,062.

BRIEF SUMMARY OF THE INVENTION

The present invention relates to a flashing light system for mounting on the roof of a police or other vehicle where flashing lights are desired for warning purposes. It is common to provide flashing lights on the roof of a vehicle, and the most common type of light utilized is a rotating light which creates a flashing effect as the light beams move past the line of sight of an observer. It is also known to utilize reflectors or mirrors in connection with a rotating light, and a well known system of the foregoing type is shown in Gosswiller U.S. Pat. No. 3,404,371, granted Oct. 1, 1968, and assigned to the assignee of the present invention.

It is a general object of the present invention to provide an improved flashing light system comprising a plurality of lights, each associated with a reflector or lens which is rotatable about the light axis to create a flashing effect, the various reflectors or lenses being arranged in predetermined rotational positions relative to one another and being driven conjointly from common drive means.

It is also an object of the present invention to provide an improved flashing light system comprising a plurality of stationary lights each associated with a reflector or lens which is rotatable about the light axis to create a flashing effect, the lights preferably being arranged side-by-side across the width of a vehicle roof.

Another object of the invention is to provide a light system as last above-mentioned where the plurality of reflectors or lenses are driven conjointly from a common drive motor.

A further one of my objects is to provide a flashing light system of the foregoing type where the beam-shaping lenses are arranged at selected angles relative to each other to create a predetermined sequence of light flashes.

The foregoing and other objects and advantages of the invention will be apparent from the following description of a preferred embodiment, taken in conjunction with the accompanying drawings.

DESCRIPTION OF THE DRAWINGS

FIG. 1 is a top plan view of a light system constructed in accordance with the present invention, the housing being in section to illustrate the interior components;

FIG. 2 is a front elevational view of the light system of FIG. 1 with the housing shown in section to more clearly illustrate the individual light assemblies and related components;

FIG. 3 is a fragmentary top plan view, the housing being in section, illustrating an alternative light arrangement at the end of the housing;

FIG. 4 is a fragmentary top plan view illustrating a second alternative arrangement of light members at the end of the housing;

FIG. 5 is another fragmentary top plan view illustrating a third alternative arrangement of light members at the end of the housing;

Figure 6:
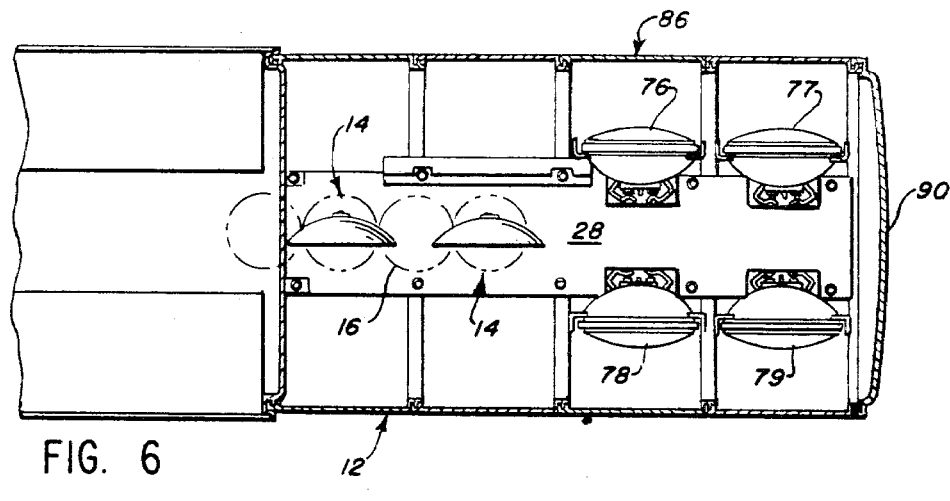
FIG. 6 is a further fragmentary top plan view illustrating a fourth alternative arrangement of light members at the end of the housing.

Now, in order to acquaint those skilled in the art with the manner of making and using my invention, I shall describe, in conjunction with the accompanying drawings, a preferred embodiment of the invention.

DETAILED DESCRIPTION OF THE INVENTION

Referring now to the drawings, and in particular to FIGS. 1 and 2, there is shown a light system 10 including a housing 12 in which are mounted a plurality of individual light assemblies 14 between which are disposed idler gears 16. There is also shown at the center of the housing 12 a speaker assembly comprising a speaker 18 connected to a pair of driver members 20 by a Y-shaped coupling 22. The speaker assembly is an optional accessory for use with the lighting assembly when mounted on police or other emergency vehicles which require a siren or other audible warning signal.

Figure 7:
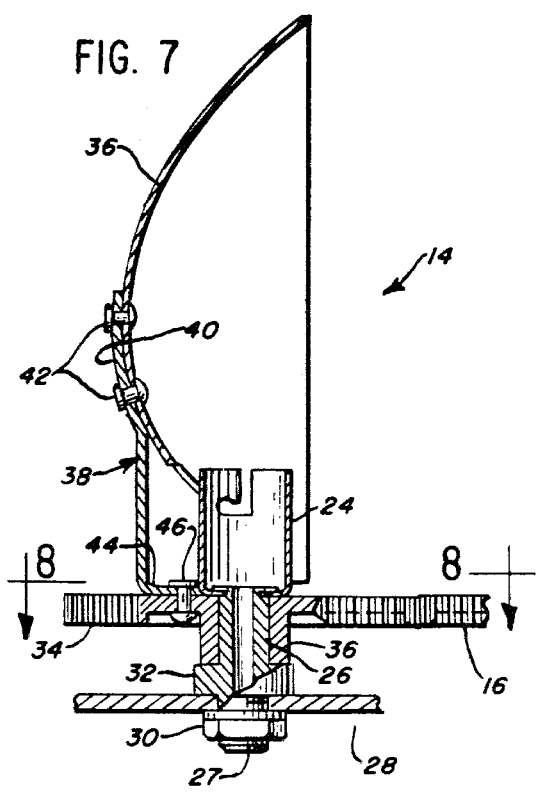
FIG. 7 is a fragmentary vertical sectional view taken through one of the individual lamp socket and reflector assemblies.

Referring now to FIG. 7, each individual light assembly 14 includes a lamp bulb socket 24 secured at its lower end to a sleeve 26. The sleeve 26 has a threaded lower end 27 which projects downwardly through a mounting plate 28 and is fixedly secured by a nut 30. The threaded lower end 27 is preferably hollow so that wiring for the lamp may be passed downwardly therethrough. The sleeve 26 also includes an annular shoulder 32 which seats against the top of the mounting plate 28. A spur gear 34 has a downwardly projecting sleeve 36 which surrounds the fixed sleeve 26 and bears on the upper surface of the annular shoulder 32. In the foregoing manner, the spur gear 34 is rotatable on the fixed sleeve or hub 26 about the vertical axis of the lamp socket 24.

A generally parabolic reflector or mirror 36 is mounted to the top of the rotatable spur gear 34 by a bracket 38. The bracket 38 includes an upper curved portion 40 which is secured to the back of the reflector 36 by a pair of rivets 42, and it further includes a bent horizontal portion 44 at its lower end which seats on the top of the spur gear 34 and is secured by a rivet 46. There are preferably two such horizontal bent portions 44 on opposite sides of the lamp socket 24, only one being shown in FIG. 7.

It will now be understood that each of the individual lamp assemblies 14 includes a stationary lamp socket 24 secured to a common mounting plate 28 (see FIGS. 1 and 2), and each lamp socket is surrounded by a rotatable spur gear 34 having a parabolic reflector 36 mounted thereon for rotation about the vertical axis of the lamp socket. In addition, each lamp socket contains an incandescent or halogen type light bulb 48 as shown in FIG. 2.

In order to drive the various spur gears 34, the idler gears 16 are disposed between each of the spur gears. Each idler gear 16 is of the same construction as the spur gears 34 and is rotatably mounted on the top of the common mounting plate 28 in similar fashion, except the fixed sleeve 26 used for supporting an idler gear 16 need not have an internal passage to accommodate wiring, and it does not have a lamp socket secured to its upper end. Each of the idler gears 16 meshes in driving relationship with the spur gears 34 on opposite sides thereof.

As shown in FIG. 2, the two innermost idler gears 16a and 16b are interconnected by an endless drive belt 52. Thus, the idler gear 16a has secured thereto a pulley 54a, and the idler gear 16b has secured thereto a pulley 54b, the two pulleys being disposed below the mounting plate 28 and connected with their respective idler gears for conjoint rotation therewith. The endless drive belt 52 extends around the two pulleys 54a and 54b, with the result that rotation of any one of the gears 16 or 34 will produce conjoint rotation of all the gears. The drive belt 52 preferably has teeth formed thereon which cooperate with corresponding grooves in the pulleys 54a and 54b, as is known in the art to assure a positive drive system.

Figure 9:
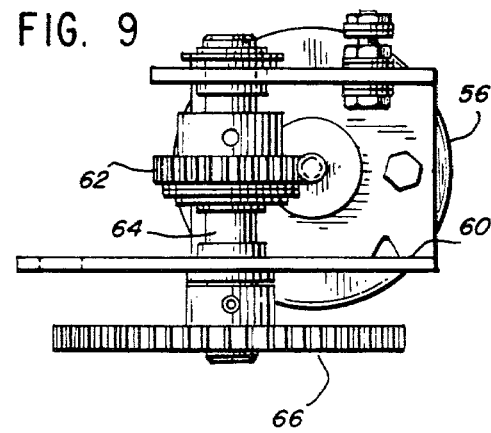
FIG. 9 is a detail side elevational view of the drive motor for rotating the several reflectors.

FIG. 1 shows a motor 56 for driving one of the idler gears 16c from which all of the other spur gears 34 and idler gears 16 are driven. The motor 56 is supported from the mounting plate 28 by a bracket 58, and as shown in FIG. 9, the motor drives a worm 60 which drives a worm gear 62. The worm gear 62 is mounted on a shaft 64, and a drive gear 66 is fixedly secured to the end of the shaft 64 for rotation therewith. As shown in FIG. 1, the drive gear 66 meshes with the idler gear 16c. Accordingly, operation of the drive motor 56 will rotate the idler gear 16c, thereby effecting rotation of all of the parabolic reflectors or mirrors 36, each reflector being rotated about the vertical axis of the lamp bulb 48 associated therewith so as to produce the desired flashing effect.

It is an advantage of the present invention that the several lamp sockets 24 are stationary, as there is no need to provide collector rings and the like as required with a rotating light source. It is also an advantage of the invention that a large plurality of individual light sources are mounted side-by-side across the width of a vehicle roof, because the resulting large number of individual light flashes create a very significant impact on an observer and as a result the light system described herein is unusually effective.

Another very important advantage of the present invention relates to the adaptability of the system to provide an unlimited variety in the sequence of the light flashes by simply setting the various reflectors 36 in predetermined positions relative to one another. Thus, it will be understood that if all the reflectors 36 are set in the same relative position, i.e., they all face forwardly at the same time, the result will be that all of the light sources 48 will flash forwardly at the same time, followed by a predetermined pause, and then another series of simultaneous forward light flashes.

It is important to note that the above described flash-pause-flash-pause sequence with all lights flashing together is only one of an unlimited variety of flash sequences which can be achieved by the present invention simply by variations in the relative positions of the reflectors 36. For example, the reflectors 36 can be set so that the lights flash in sequence beginning with the first light on the far left in FIG. 1 and ending with the last light on the far right, thus providing a series of eight flashes from left to right, which sequence is repeated with or without an intermittent pause as desired. Of course, the reverse of the foregoing can be achieved, with the eight lights flashing seriatim beginning at the far right and moving toward the left.

Another variation is to arrange the reflectors 36 so that the two outermost lights flash together, and then the next two lights flash together as you progress toward the center, and so on. The reverse of the foregoing can also be achieved with the two innermost lights flashing together and then the next two lights as you move outwardly toward the sides of the vehicle, and so on. The foregoing are merely a few examples of the unlimited possible sequences which can be achieved, since it will be understood that any adjustment in the rotational position of a reflector 36 relative to the position of the other reflectors will alter the flashing sequence which is achieved as the several reflectors are rotated conjointly by the motor 56.

Figure 8:
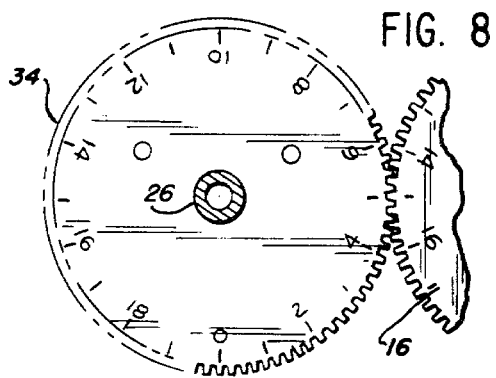
FIG. 8 is a detail top plan view of the spur gear member of FIG. 7 on which the reflector is mounted for rotation about the axis of the lamp socket.

In order to facilitate the setting of the initial positions of the several reflectors 36, or the subsequent adjustment thereof, the top surface of each spur gear 34 has twenty indicator marks formed around the outer portion thereof at equally spaced intervals of 18 degrees, and ten indicator numbers are applied (see FIG. 8). In conjunction therewith, a small indicator mark is formed on the mounting plate 28 directly in front of each spur gear 34 (see 68 in FIG. 1) so that a given indicator mark on the spur gear may be aligned therewith. Such an arrangement makes it possible to devise a desired flash sequence and designate the same by assigning a position number to each of the eight spur gears 34.

In the foregoing manner, an assembler need only place each spur gear 34 in a pre-assigned position by aligning the designated number thereon with the indicator mark 68 on the mounting plate 28, and the desired flashing effect will be achieved during operation of the system. The particular embodiment described herein is primarily intended for setting at the factory rather than for adjustment by a user in the field. However, it will readily be understood that field adjustment can be provided by simply mounting the spur gears 34 so they can be raised to a disengaged position, rotated to a different desired position, and then returned to engagement with the adjacent idler gears 16.

The embodiment illustrated in FIGS. 1 and 2 includes eight of the individual light assemblies 14 arranged side-by-side on the common mounting plate 28, with four light assemblies located on each side of the center where the speaker 18 is housed. While variations are possible, it is intended that the system be mounted on the roof of a vehicle with the mounting plate 28 extending from side-to-side along a line transverse to the longitudinal axis of the vehicle. It will be understood that different numbers of the individual light assemblies 14 may be utilized. However, in order to achieve significant benefit from the flashing effects made possible by the invention, it is desirable that at least two individual light assemblies be provided on each side of the center for a total of four light assemblies.

FIGS. 3-6 illustrate the use of one or more conventional stationary lights with built-in reflectors positioned at the outer end of the housing 12 in conjunction with the individual light assemblies 14 of the present invention. Thus, referring only to the right half of the housing 12 as illustrated in the foregoing drawings, FIG. 3 shows three individual light assemblies 14, together with a pair of conventional lights 70 and 72 at the end of the housing, one of the latter lights facing forwardly and the other rearwardly. FIG. 4 shows a different arrangement where the end of the housing 12 contains a single conventional light 74 aimed to the side out the end of the housing for alley illumination and the like. FIG. 5 illustrates a combination of the foregoing two embodiments and includes three conventional lights 70′, 72′ and 74′. FIG. 6 shows still another arrangement where only two of the individual light assemblies 14 are provided, in conjunction with four conventional lights 76–79, two of the latter facing forwardly, and two rearwardly.

Where an alley illuminating light is utilized, such as at 74 in FIG. 4, or at 74′ in FIG. 5, the flashing effect of the lighting system of the present invention is impaired slightly at the sides due to interference by the alley illuminating light. Such interference may be alleviated to some extent by providing a pair of stationary reflectors 80 and 82 which direct a portion of the light rays from the individual light assemblies 14 outwardly toward the side at an angle where they will not be interrupted by the alley light. FIG. 4 further shows a V-shaped mirror 81 positioned immediately to the left of the alley illuminating light 74 so as to divert some of the light rays away from the light 74 which otherwise would block them.

Referring to the housing for my new light system, there is provided an aluminum extrusion 84 (see FIG. 2) which extends the full length of the housing 12 and forms the underside thereof. The base extrusion 84 connects at its underside with a block member (not shown) which serves to mount the entire assembly on the roof of a vehicle. The mounting plate 28 is fixedly secured to the top of the base extrusion 84, and an elongated C-shaped transparent dome 86 comprised of a plurality of modular panels covers the entire lighting assembly and has its lower portion secured along the length of the base extrusion 84 on both the front and rear sides thereof. There are also provided a pair of transparent end caps 88 and 90 which seal the end of the housing 12. In the embodiments of FIGS. 4 and 5 where the light 74 or 74′ is used, a clear plastic lens 92 is centrally mounted in the end cap 90.

FIGS. 1 and 2 further show a pair of bulkheads 94 and 96 which seal off the left and right hand light compartments from the center speaker compartment for the speaker 18, this being desirable because the speaker compartment includes a grille having openings to the atmosphere. As best shown in FIG. 2, a top aluminum extrusion 98 bridges across the speaker compartment and interconnects the bulkheads 94 and 96.

The various components of the housing 12 for the light system of the present invention are described in greater detail in my U.S. Pat. No. 4,189,709, granted Feb. 19, 1980.

In the embodiment described hereinabove, each of the plurality of light assemblies comprises a stationary light source in combination with a reflector which rotates about the light source to produce a series of light flashes in different directions. Of course, an important feature of the invention resides in the orientation of the light assemblies in different rotational positions relative to one another, such relative positions being maintained during conjoint rotation of the light assemblies so as to produce a predetermined sequence of light flashes and thereby permit creation of a variety of different flashing effects.

An important advantage of the foregoing embodiment is that the use of stationary light sources eliminates the need for collector rings or the like as is required in conjunction with rotatable light sources. However, it should be understood that conventional sealed beam lights with built-in reflectors may be utilized in conjunction with the present invention. In such an application, the light assemblies including the light sources and reflectors are rotated. By orienting the light assemblies in different rotational positions relative to one another, and rotating them conjointly from a common drive so as to maintain their relative positions, it is possible to achieve the above-described predetermined sequence of light flashes so as to permit creation of a variety of different flashing effects.

Figure 10:
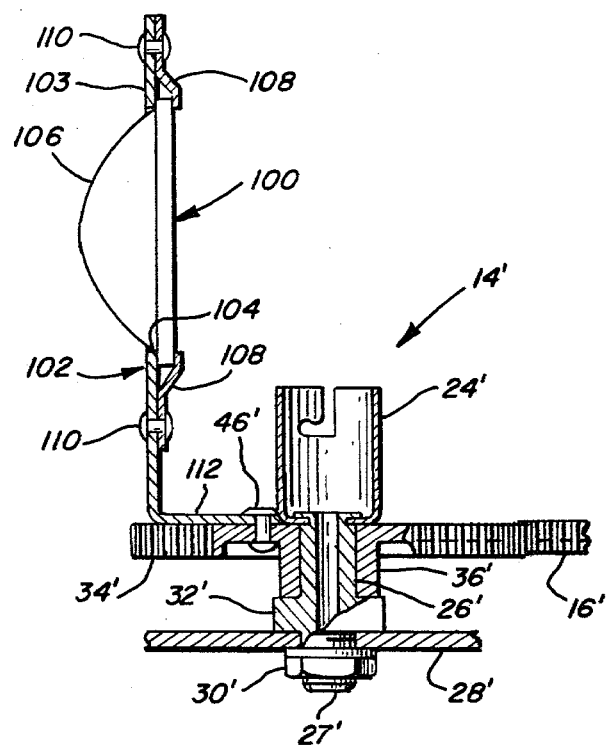
FIG. 10 is a fragmentary vertical sectional view similar to FIG. 7 showing an alternative embodiment where a beam-shaping lens rather than a reflector is mounted on the gear 34 for rotation about a stationary lamp.

Reference is now made to FIG. 10 which illustrates an alternative embodiment of the invention where a lens member rotates about a substantially vertical axis rather than a reflector. The embodiment of FIG. 10 is similar to the embodiment of FIG. 7, except a beam-shaping lens member positioned in front of the light source is substituted for the reflector 36. Accordingly, corresponding primed reference numerals are used in FIG. 10 as in FIG. 7 for corresponding parts.

As shown in FIG. 10, each individual light assembly 14′ includes a fixed lamp bulb socket 24′ secured at its lower end to a bushing 26′. The bushing 26′ has a screwthreaded lower end 27′ which projects downwardly through a mounting plate 28′ and is fixedly secured by a nut 30′. The threaded lower end 27′ is preferably hollow so that wiring for the lamp may be passed downwardly therethrough. The bushing 26′ also includes an annular shoulder 32′ which seats against the top of the mounting plate 28′. A spur gear 34′ has a downwardly projecting sleeve 36′ which surrounds the fixed bushing 26′ and bears on the upper surface of the annular shoulder 32′. In the foregoing manner the spur gear 34′ is rotatable on the fixed bushing or sleeve 26′ about the vertical axis of the lamp socket 24′.

A beam-shaping lens 100 is mounted to the top of the rotatable spur gear 34′ by a bracket 102. The bracket 102 has an upright portion 103 including an opening 104 through which a convex portion 106 of the lens projects. The lens 100 is held to the bracket 102 by a plurality of clamp members 108 secured by rivets or the like 110. The bracket 102 further includes a horizontal portion 112 which seats on the top of the spur gear 34′ and is secured by a rivet 46′. There are preferably two such horizontal bent portions 112 on opposite sides of the lamp socket 24′, only one being shown in FIG. 10.

It will now be understood that in the embodiment of FIG. 10, each of the individual lamp assemblies 14′ includes a stationary lamp socket 24′ secured to a common housing plate 28′ (as shown at 28 in FIGS. 1 and 2), and each lamp socket 24′ is surrounded by a rotatable spur gear 34′ having a lens 100 mounted thereon for rotation about the vertical axis of the lamp socket. In addition, each lamp socket 24′ contains an incandescent or halogen type light bulb 48 shown in FIG. 2.

The lens 100 of FIG. 10 mounted in front of each lamp socket 24′ serves the same function as the reflector 36 of FIG. 7, and as it rotates about the stationary light bulb 48 it focuses the light beam and produces a generally horizontal beam which as it rotates produces generally horizontal light flashes in different radial directions.

An advantage of the foregoing embodiment is that the use of stationary light sources eliminates the need for collector rings and brushes as are required in conjunction with rotatable light sources. However, it should be understood that a sealed beam light with a built-in beam-shaping lens may be utilized in conjunction with the present invention. In such an application, the light assemblies including the light sources and beamshaping lenses are rotated.

What is claimed is:

1. A flashing light warning system for mounting on the roof of a vehicle comprising, in combination, at least four individual light assemblies each including a light source and a beam-shaping lens, said lens portion of each of said light assemblies being rotatable about a generally vertical axis for producing generally horizontal light flashes in different radial directions, said light assemblies being mounted in a common housing in generally side-by-side relation spaced transversely across the width of a vehicle roof on which said housing is mounted, certain of said lenses being oriented in different rotational positions with respect to other lenses to produce a predetermined sequence of flashes from different ones of said light assemblies, each of said lenses being interconnected with one another to maintain the relative orientation between them during rotation thereof, and motor drive means for conjointly rotating said lenses.

2. A flashing light warning system as defined in claim 1 comprising at least three light assemblies mounted in a left hand section of said housing and at least three light assemblies mounted in a right hand section of said housing, certain of the lenses in the left hand housing section being oriented in different rotational positions with respect to each other and certain of the lenses in the right hand housing section being oriented in different rotational positions with respect to each other, and the lenses in said left hand housing section being rotationally positioned in a manner symmetrical to the lenses in said right hand housing section.

3. A flashing light warning system as defined in claim 1 comprising at least three light assemblies mounted in a left hand section of said housing and at least three assemblies mounted in a right hand section of said housing, the rotational position of each of the six lenses being advanced a predetermined increment from an adjacent lens so that said lenses produce a series of light flashes seriatim beginning at one end of the plurality of light assemblies and progressing to the other end thereof.

4. A flashing light warning system as defined in claim 1 comprising at least three light assemblies mounted in a left hand section of said housing and at least three light assemblies mounted in a right hand section of said housing, said left and right hand housing sections being separated by a center housing section, each of the lenses mounted in said left hand section of the housing being interconnected for conjoint rotation by a first set of gears, each of the lenses mounted in said right hand section of the housing being interconnected for conjoint rotation by a second set of gears, and said drive means including means interconnecting said first and second sets of gears.

5. A flashing light warning system as defined in claim 4 where each lens is mounted on its own individual lens gear which is rotatable about a vertical axis, said lens gears being spaced from each other and interconnected by a plurality of idler gears disposed between adjacent lens gears in driving relation therewith.

6. A flashing light warning system as defined in claim 1 where each of said rotatable lenses has indicator means associated therewith to facilitate setting the rotational positions of said lenses relative to one another.

7. A flashing light warning system as defined in claim 1 where said motor drive means comprises a single drive motor for conjointly rotating all of said lenses.

8. A flashing light warning system as defined in claim 1 where each lens is fixedly mounted on an individual lens gear, interconnecting means including a plurality of idler gears interconnecting said lens gears for conjoint rotation, and said lens gears being adjustably mounted relative to one another to permit adjustment of the rotational position of any selected lens relative to the other lenses thereby permitting variation of the flash sequence.

* * * * *